Nov. 25, 1930.  E. W. KELLOGG  1,783,045

CONTACT FILM PRINTER

Filed Oct. 4, 1929

Inventor
Edward W. Kellogg,
by Charles E. Tullar
His Attorney.

Patented Nov. 25, 1930

1,783,045

UNITED STATES PATENT OFFICE

EDWARD W. KELLOGG, OF SCHENECTADY, NEW YORK, ASSIGNOR TO GENERAL ELECTRIC COMPANY, A CORPORATION OF NEW YORK

CONTACT FILM PRINTER

Application filed October 4, 1929. Serial No. 397,394.

My invention relates to apparatus for making contact prints of films, particularly films of the motion picture type which bear sound records. Contact film printing apparatus in common use has the record and sensitive films drawn through the exposing light by means of a sprocket, the two contiguous films being supported on the periphery of the sprocket at the printing point with the record film, for example, the negative, next to the sprocket or on the concave side since it is always slightly shrunken or at least more shrunken than the sensitive or raw film. If it so happens that the curvature of the sprocket employed is such that the difference in shrinkage of the two films is exactly compensated, the movement of the two films through the exposing light may be satisfactory. Film shrinkage, however, is a variable quantity and in practice films having widely different shrinkage are encountered. Whenever in such printers the difference in the film shrinkage is not exactly compensated by the curvature of the sprocket a certain amount of slippage must occur between the two films and blurring of the printed image results. Furthermore, any deviation in pitch of the sprocket tooth openings from the correct value for perfect sprocket tooth action results in irregularity of film movement, producing intermittent slippage of one or both films. While this irregularity may not produce blurring of the record, it gives rise to changes in frequency of the tones printed on its new stock.

It is an object of my invention to provide an improved film printing apparatus which shall avoid the above mentioned objectional features of present printers and which shall move through the printing light in the same time equal lengths of the two films as measured by their sprocket tooth perforations with a movement which is steady and free from slippage regardless of the amount of shrinkage which either or both films may have.

In accordance with my invention, I provide briefly means for supporting and moving the films at the printing point which means are free of sprocket teeth and where the films pass said printing point I vary their curvature in accordance with the difference in shrinkage thereof.

My invention will be better understood from the following description taken in connection with the accompanying drawing and its scope will be pointed out in the appended claims.

Figure 1:
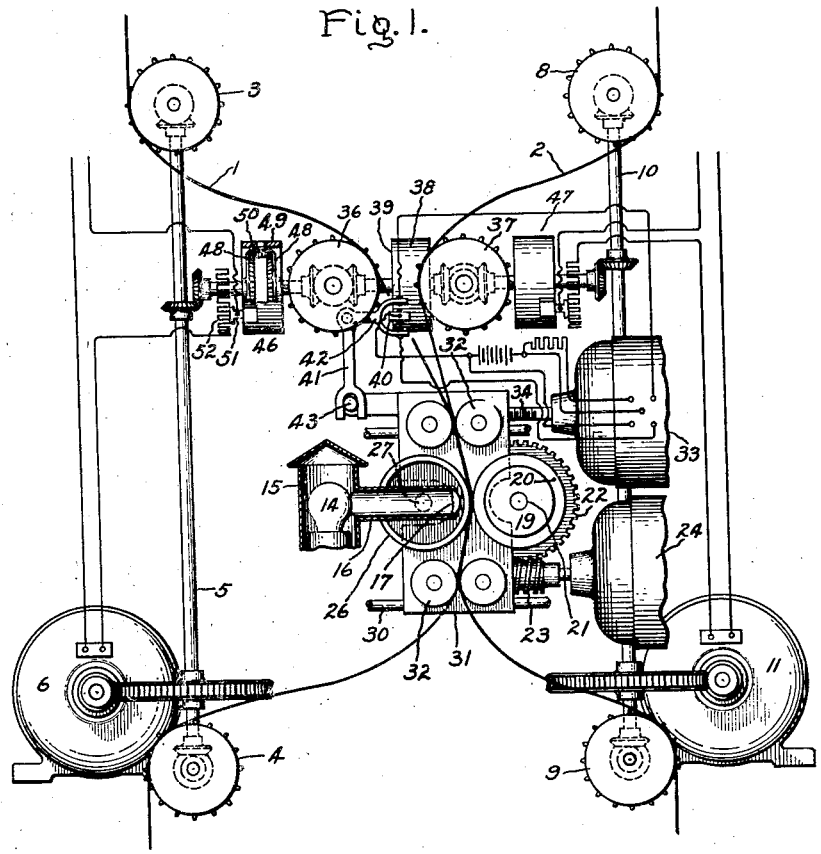
Figure 2:
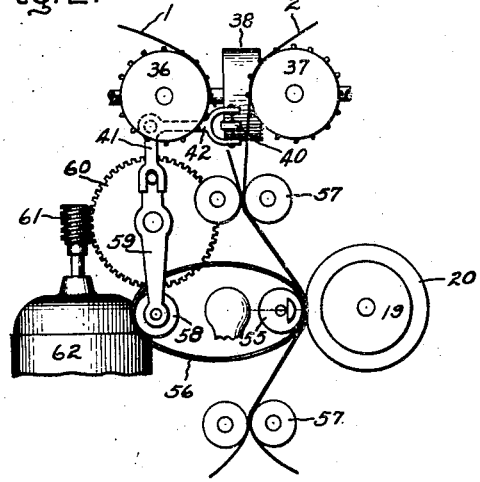
Figure 3:
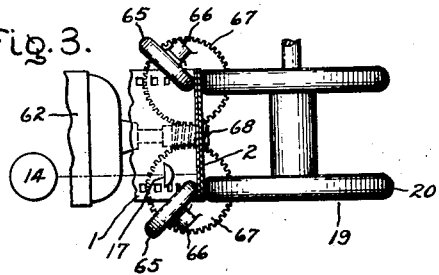

Referring to the drawing, Fig. 1 shows diagrammatically a preferred embodiment of my invention and Figs. 2 and 3 are fragmentary diagrammatic views illustrating modifications.

In the drawing where I have shown only those parts which are essential to the clear understanding of my invention, 1 is the record film which for example may be a negative and 2 is the sensitive or print film. It will be understood that these films are drawn from and pass to suitable reels or rolls enclosed in magazines and a suitable light protecting casing is provided for the apparatus to prevent fogging of the sensitive film. Film 1 is withdrawn from the take-off reel, not shown, and fed to the take-up reel, also not shown, respectively, by the sprockets 3 and 4 which by the common connecting shaft 5 are driven at the same speed by the motor 6. Likewise film 2 is withdrawn from one magazine and passed to the other magazine, not shown by the sprockets 8 and 9 respectively connected by shaft 10 with motor 11. The speed of each motor 6 and 11 is regulated by means to be described subsequently.

The optical system by means of which an exposing light is projected on the sensitive film through the record film may be of any suitable construction and that illustrated in Fig. 1 is merely shown by way of example. The light source 14 is shown enclosed by the lamp house 15 with which connects the tube 16. Supported in this tube is shown one or more lenses such as the cylindrical lens 17 for concentrating the light into a narrow transverse band on the films. Inasmuch as no slippage occurs at the point of interception of the light and the film or printing point, it may be found unnecessary to concentrate the light into a narrow band and light more nearly approaching parallelism may be found preferable.

Where the films pass the printing point they are driven by the roller 19 having two spaced resilient tires 20 which roller in turn is driven at a uniform speed. The roller 19 is mounted on the same shaft 21 as the worm gear 22 with which meshes the worm 23 on the shaft of the constant speed driving motor 24. Opposite the roller 19 is a suitable curved abutment member which presses the films against the roller with sufficient pressure to obtain the necessary traction. The abutment member may be in the form of a fixed skid or a freely rotatable member. In Fig. 1, I have shown this member as a pair of rings 26 which are mounted for free rotation in shafts 27 and preferably so spaced that they engage only the marginal portions of the films. Between the rings and opposite the points of application of the driving force extends the tube 16 of the optical system. To obtain the desired degree of control of the films, I have found it desirable that roller 19 at least should have a smooth resilient periphery. Good results have been obtained when both the roller 19 and the rings 26 have been provided with rubber tires, however, I prefer to use on the rings either no tires at all or thin rubber tires only. The reason that it is desirable to have the softer tire on the roller 19 is that the roller would in practically all work be on the convex side of the films and the use of a softer tire on one side than on the other tends to bend the films so that their convex sides are toward the soft tire. Bending or curving the films to the desired degree over the rings 26 is effected by means now to be described.

Supported on the guide rods 30 is the slide 31 on which are mounted two pairs of rollers 32 arranged respectively above and below the printing point. The rollers are mounted to rotate freely and those of each pair are spaced apart just sufficient to pass the two films. For moving the slide 31 on the guides 30 I have shown the reversible motor 33 whose shaft 34 is threaded into the slide. It will be seen that as the shaft of motor 33 turns one way or the other the slide carrying the rollers 32 moves to the right or left and this bends the films, causing them to assume various degrees of curvature as they pass the driving point.

Inasmuch as the films usually employed for sound records are provided with sprocket tooth perforations, the difference in the number of sprocket holes passing a given point in a given time during the printing operation provides a convenient measure of the difference in shrinkage of the two films. For counting the number of sprocket tooth openings in the two films and indicating the difference thereof I have provided the free running sprockets 36 and 37 which engage the films 1 and 2 and have connected the shafts of these sprockets respectively to the two similar bevel gears of a simple differential gearing shown at 38 of which the planetary gear is supported by and rotates the ring 39. On ring 39 is the movable contact 40. This differential is of well known construction and is similar to that shown at 46 subsequently described. If the two films in view of their relative shrinkage and of their radius of curvature at the driving point where they are gripped between drum 20 and rings 26, are moving at such relative speeds that they pass the same number of sprocket holes in a unit of time, then the sprockets 36 and 37 will run at identical speeds. The result will be that the ring 39 and contact 40 remain motionless. If they travel a different number of sprocket holes per unit of time the differential gearing will cause the contact to move one way or the other. If desired the operator by observing this movement may move the slide 31 manually until the movement ceases, at which time the curvature of the films over the rings 26 is such as to compensate exactly for the difference in sprocket hole pitch in the two films. I prefer to move the slide automatically and for that reason have provided the bell crank lever 41 having on one arm the yoke 42 embracing the contact 40 which is carried on the differential gear ring 39, and having a pair of contacts either one of which may engage the contact 40. The other arm of the lever 41 has a yoke embracing the pin 43 on an extension of the slide. The contact 40 on the differential ring and the two contacts on the yoke 42 are suitably connected to a source of supply, shown as a battery, and to the motor 33 whereby the screw 34 is caused to rotate in one direction or the other depending upon whether the upper or lower contact on the yoke 42 is closed. The bellcrank lever connection with the slide serves automatically to open the motor circuit in response to movement of the slide. Thus, if either contact is closed as a result of a change in position of the differential ring 39, the motor moves the slide to a new position, at which the contacts are again open. The position of the slide is therefore controlled by the position of the differential ring 39, without requiring the differential gears to transmit any appreciable amount of work or force. The position of the slide governs the curvature of the films at the driving point where they are pressed against the roller 19, and therefore determines the relative speed of the two films as has been previously explained.

In order that the roller 19 may be relieved of the work of withdrawing the films from their respective take-off reels or rolls and be relieved of any irregularities of film tension incident to them and to the take-up reels or rolls, I govern the speeds of the motors 6 and 11 which drive respectively sprockets 3 and 4 and sprockets 8 and 9, so that there shall always be some slack film between them and the roller 19. Here again I employ differential gearing 46 and 47 the one being identical with the other. Referring to gearing 46, the two similar bevel gears 48 are connected to be rotated in opposite directions respectively by the sprocket 36 and the shaft 5. The freely rotatable ring 49 carrying the planetary wheel 50 has attached to it the movable contact 51 of the rheostat 52 which is shown connected in series with the motor 6. The speed of motor 6 is thereby varied in accordance with the speed of sprocket 36 there being sufficient slack film between roller 19 and sprockets 3 and 4 to prevent interference from the reels with the proper movement of the films through the exposing light.

The curvature of the films as they pass between the roller 19 and rings 26 is governed in part by the character of the tires on the rings and in part by the stiffness of the films themselves, as well as by the position of the guide rollers 32 on the slide 31. It may happen that by the time sufficient pressure is exerted between the drum and the rings at the driving point to insure freedom from slippage between the films, the tire compressibility may be found to predominate over the film stiffness in determining curvature, and therefore adequate control may not be attained. To overcome this difficulty it may be desirable to back the films by a ribbon of stiffer material such as thin spring steel. Such a ribbon should be uniform in stiffness throughout its length, and when free from strain should be flat or else of uniform curvature. The ribbon might be of the full width of the film and might be placed behind the film on which the print is being made, or in other words next the roller 19 so that it would not intercept the printing light. It would pass between the guide rollers 32 in order that its curvature would be controlled, separate take-off and take-up reels obviously being provided for the ribbon together with suitable lateral guiding means therefor. Instead of feeding a long backing ribbon through the machine, I may use an endless ribbon or band.

In Fig. 2 I have illustrated a construction in which the backing means is in the form of a split ribbon or a pair of ribbons located on the illuminated side of the films. In this form the rings or discs 55 are smaller than the corresponding rings 26 of Fig. 1 and between them and the films 1 and 2 are a pair of similar endless ribbons or bands 56 constructed for example of steel which are of uniform stiffness and when not stressed tend to assume a normal circular form. These bands are arranged on either side of the record area and being many times stiffer than the films, control the curvature of the films at the printing point. In accordance with Fig. 2, the rollers 57 corresponding with rollers 32 of Fig. 1 are on fixed centers and the flexing of the bands 56 is effected by means of the roller 58 mounted on lever 59. This lever is connected with the worm wheel 60 meshing with the worm 61 on the shaft of the reversible motor 62 whereby the opposite rotation movements of the motor shaft vary the angular position of lever 59 and hence the shape of the bands 56. An upward extension of the lever 59 operates the bell crank lever 41 as in Fig. 1. It will be understood that the motor 62 in this case corresponds with the motor 33 of Fig. 1 and has circuit connections similar thereto whereby the motor is caused to rotate in one direction or the other in accordance with the difference of movement of the sprockets 36 and 37. The films in passing between the flexible bands and the soft tired roller 19 are pressed tightly together and are held closely in contact with the bands at the printing point.

In Fig. 3 where I have illustrated another modification of my invention, the films 1 and 2 are pressed between a pair of soft tired rollers 19 and a pair of rollers 65 having round tires which are somewhat harder but which may nevertheless be made of rubber. Each roller 65 is freely rotatable in its bearing 66 which is shown as supported on a worm gear 67. The axis of each worm gear and hence the center line about which each roller 65 is swiveled is tangent to the circle which lies at the center of the round tire of the roller. The two worm gears 67 mesh with a common worm 68 which is shown on the shaft of the reversible motor 62. Thus as the motor shaft rotates in one direction or the other and the rollers 65 turn on their swivel centers the position of the films at printing point is not altered but the curvature is changed from a maximum when the two rollers are parallel to zero when they are turned 90° from that position. In practice this 90° position would never be used. Turning of the rollers on their swivels from the parallel position results in a wiping action of the tires against the film but the films being bent into an arc are stiff in the crosswise direction, and no detrimental effect occurs as a result of this wiping action.

While I have described several embodiments of my invention, I do not wish to be limited to the particular forms shown and described as it will be apparent that many modifications may be made without departing from the scope of my invention as set forth in the appended claims.

What I claim as new and desire to secure by Letters Patent of the United States is:

1. A contact film printer comprising means for moving a plurality of films having different degrees of shrinkage in contact with each other through an exposing light, means for causing the film to move in a curved path when passing through the light with the more shrunken film on the concave side, and means for adjusting the curvature of said path to compensate for the difference in shrinkage of the films.

2. A contact film printer comprising means for directing an exposing light on a plurality of contiguous films having different degrees of shrinkage, means for causing said films to pass in a curved path at the point at which they are engaged by said light, and means governed by the difference in shrinkage of said films for controlling the degree of curvature of said path.

3. A contact film printer comprising means for moving a plurality of contiguous films having sprocket tooth openings therein through an exposing light, and means responsive to the relative number of sprocket tooth openings of said films passing a common point for flexing the films where they pass through the exposing light.

4. A contact film printer comprising means for moving a plurality of films having sprocket tooth openings therein and having different degrees of shrinkage, in contact with each other through an exposing light, means for causing the films to travel in a curved path through the light with the film of the greater shrinkage on the concave side of the path, and means responsive to the relative number of sprocket tooth openings passing the light for controlling degree of curvature of said path.

5. A contact film printer comprising means for moving a plurality of contiguous films having sprocket tooth openings therein through an exposing light, a sprocket wheel engaging each of said films, means for flexing the films where they pass through said light, and means responsive to the relative movement of the sprocket wheels for controlling said flexing means.

6. A contact film printer comprising rotatable members between which a plurality of contiguous films having sprocket tooth openings are caused to pass in a curved path, means for directing an exposing light on the films at the curved path, means for adjusting the degree of curvature of said curved path, and means controlled by the difference in the number of sprocket tooth openings of said films passing a common point in a given time for controlling said adjusting means.

7. A contact film printer comprising a plurality of convex members between which a plurality of contiguous films having sprocket tooth openings are caused to pass in a curved path, means for directing an exposing light on the films at the curved path, means for adjusting the degree of curvature of the curved path, a sprocket wheel arranged to engage each of said films, and means including a differential mechanism responsive to a difference in rotative movement of said sprocket wheels for controlling said adjusting means.

8. A contact film printer comprising a source of light, means arranged to support a plurality of contiguous films in a curved path at the point of application of said light, means for varying the curvature of said path and means independent of sprocket teeth for imparting motion to said films at points opposite the point of application of the light.

9. A contact film printer comprising a source of light, means arranged to support a pair of contiguous films having sprocket tooth openings therein in a curved path at the point of application of said light, means for varying the curvature of said path whereby equal numbers of sprocket tooth openings of the two films pass the printing light in a given interval of time, and driving means arranged to resiliently press the films against the supporting means at points opposite the point of application of the light.

In witness whereof, I have hereunto set my hand this 3rd day of October, 1929.

EDWARD W. KELLOGG.